(12) United States Patent
Srinivasan et al.

(10) Patent No.: US 12,112,211 B2
(45) Date of Patent: Oct. 8, 2024

(54) SYSTEM FOR OPTIMIZING RESOURCES FOR CLOUD-BASED SCALABLE DISTRIBUTED SEARCH DATA ANALYTICS SERVICE

(71) Applicant: Accenture Global Solutions Limited, Dublin (IE)

(72) Inventors: Madhan Kumar Srinivasan, Bangalore (IN); Guruprasad Pv, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 411 days.

(21) Appl. No.: 17/314,820

(22) Filed: May 7, 2021

(65) Prior Publication Data
US 2022/0374283 A1    Nov. 24, 2022

(51) Int. Cl.
*G06F 9/50* (2006.01)
*G06F 11/34* (2006.01)

(52) U.S. Cl.
CPC .......... *G06F 9/5077* (2013.01); *G06F 9/5016* (2013.01); *G06F 9/5044* (2013.01); *G06F 9/505* (2013.01); *G06F 11/3409* (2013.01)

(58) Field of Classification Search
CPC .... G06F 9/5077; G06F 9/5016; G06F 9/5044; G06F 9/505; G06F 11/3409; G06F 2209/503
See application file for complete search history.

(56) References Cited

U.S. PATENT DOCUMENTS

| | | | |
|---|---|---|---|
| 10,459,757 B1 * | 10/2019 | Srinivasan | .......... G06F 9/45558 |
| 2018/0165033 A1 * | 6/2018 | Baig | ..................... G06F 3/0605 |
| 2019/0245757 A1 | 8/2019 | Meyer et al. | |

(Continued)

OTHER PUBLICATIONS

Ran Sheinberg, "Optimizing Amazon EMR for resilience and cost with capacity-optimized Spot Instances", AWS Big Data Blog, published Oct. 20, 2020, 7 pages; https://aws.amazon.com/blogs.big-data/optimizing-in-amazon-emr-for-resilience-and-cost-with-capcity-optimized-spot-instances/.

(Continued)

*Primary Examiner* — Sisley N Kim
(74) *Attorney, Agent, or Firm* — Polsinelli PC

(57) ABSTRACT

Embodiments of this disclosure disclose a method and system for optimizing resources for cloud-based scalable distributed search data analytics service. The method may include generating a computing capacity rightsizing recommendation on the computing capacity based on the computing utilization metrics and generating a memory capacity rightsizing recommendation on the memory capacity based on the memory utilization metrics. The method may further include determining a recommended instance type for the service resource unit based on the computing capacity rightsizing recommendation and the memory capacity rightsizing recommendation. The method may further include performing a storage volume check on the service resource unit to obtain a storage volume check result. The method may further include determining whether to accept the recommended instance type as a final optimization recommendation based on the storage volume check result, the computing capacity rightsizing recommendation, and the memory capacity rightsizing recommendation.

20 Claims, 7 Drawing Sheets

(56) References Cited

U.S. PATENT DOCUMENTS

2020/0034057 A1  1/2020  Srinivasan et al.

OTHER PUBLICATIONS

"Using EMR Managed Scaling in Amazon EMR", Apr. 30, 2021, 2 pages, https://docs.aws.amazon.com/emr.latest/ManagementGuide/emr-managed-scaling.html.
Office Action in India Application No. 202244021563, dated Dec. 12, 2022, 5 pages.

\* cited by examiner

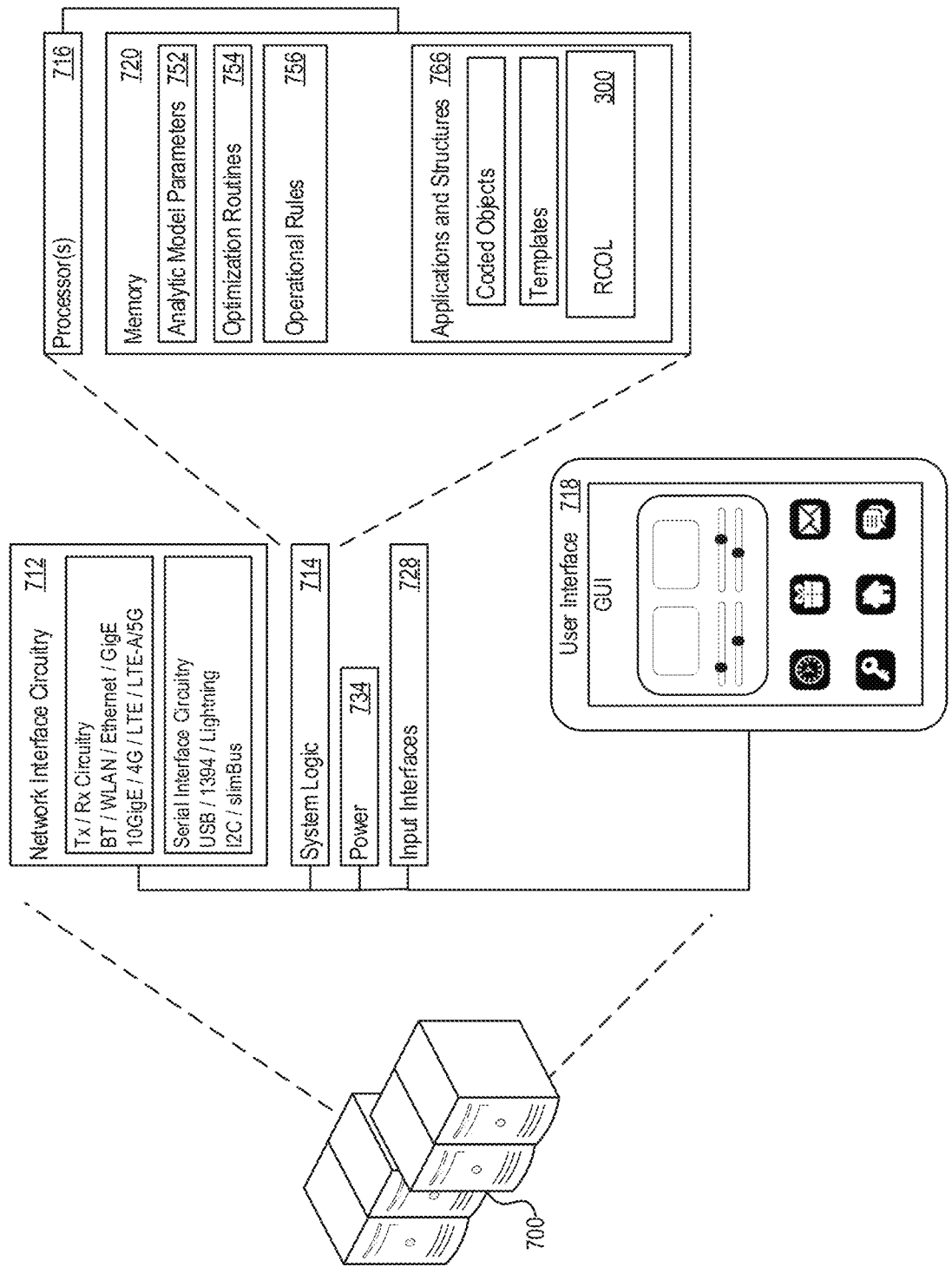

SYSTEM FOR OPTIMIZING RESOURCES FOR CLOUD-BASED SCALABLE DISTRIBUTED SEARCH DATA ANALYTICS SERVICE

TECHNICAL FIELD

This disclosure relates to cloud computing, in particular, to optimizing resources for cloud-based scalable distributed search data analytics service.

BACKGROUND

Rapid advances in communications and storage technologies, driven by immense customer demand, have resulted in widespread adoption of cloud systems for managing large data payloads, distributed computing, and record systems. Cloud computing services introduce numerous databases with different categories and types. As one of the cloud computing services, a cloud-based scalable distributed search data analytics service, such as Amazon® Elasticsearch™ Service, is widely used in modern enterprise systems to perform various search and analytics function including log analytics, real-time application monitoring, and click stream analytics.

SUMMARY

This disclosure relates to a system for optimizing the resource configuration provisioned on the service resource unit such as a service node or a service cluster for a cloud-based scalable distributed search data analytics service, including rightsizing computing capacity, memory capacity, and input/output (I/O) capacity, such as throughput rate and operation rate.

A system for optimizing the resource configuration provisioned on the service resource unit for a cloud-based data analytics service may include a network interface circuitry and an optimization circuitry in data communication with the network interface circuitry. The network interface circuitry may receive resource utilization tracking data and resource configuration data of the service resource unit and send a resource configuration optimization (RCO) token to a host interface. The host interface may execute the RCO token to optimize resource configuration of the service resource unit.

The optimization circuitry may execute a RCO stack. The RCO stack may be executable to obtain computing utilization metrics of computing capacity provisioned to the service resource unit based on the resource utilization tracking data and generate a computing capacity rightsizing recommendation on the computing capacity based on the computing utilization metrics. The RCO stack may further be executable to obtain memory utilization metrics of memory capacity provisioned to the service resource unit based on the resource utilization tracking data and generate a memory capacity rightsizing recommendation on the memory capacity based on the memory utilization metrics. The RCO stack may further be executable to determine a recommended instance type for the service resource unit based on the computing capacity rightsizing recommendation and the memory capacity rightsizing recommendation. The RCO stack may obtain an actual used storage volume based on the resource configuration data; perform a storage volume check on the service resource unit based on the computing capacity rightsizing recommendation, the memory capacity rightsizing recommendation, and the actual used storage volume, to obtain a storage volume check result; and determine whether to accept the recommended instance type as a final optimization recommendation based on the storage volume check result, the computing capacity rightsizing recommendation, and the memory capacity rightsizing recommendation. The RCO stack may further be executable to, in response to the acceptance, generate the RCO token to include instructions executable by the host interface to optimize the resource configuration of the service resource unit according to the final optimization recommendation and send the RCO token to the host interface via the network interface circuitry.

The system may also perform a method for optimizing the resource configuration provisioned on the service resource unit for a cloud-based search data analytics service. The method may include, at network interface circuitry, receiving resource utilization tracking data and resource configuration data of the service resource unit for a cloud-based data analytics service. The optimization circuitry may be in data communication with the network interface circuitry.

The method may execute a resource configuration optimization (RCO) stack at the optimization circuitry, including obtaining computing utilization metrics of computing capacity provisioned to the service resource unit based on the resource utilization tracking data and generating a computing capacity rightsizing recommendation on the computing capacity based on the computing utilization metrics. The method may further include obtaining memory utilization metrics of memory capacity provisioned the service resource unit based on the resource utilization tracking data and generating a memory capacity rightsizing recommendation on the memory capacity based on the memory utilization metrics. The method may further include determining a recommended instance type for the service resource unit based on the computing capacity rightsizing recommendation and the memory capacity rightsizing recommendation. The method may further include obtaining an actual used storage volume based on the resource configuration data; performing a storage volume check on the service resource unit based on the computing capacity rightsizing recommendation, the memory capacity rightsizing recommendation, and the actual used storage volume, to obtain a storage volume check result; and determining whether to accept the recommended instance type as a final optimization recommendation based on the storage volume check result, the computing capacity rightsizing recommendation, and the memory capacity rightsizing recommendation. In response to the acceptance, the method may further include generating a RCO token to include instructions executable by a host interface to optimize the resource configuration of the service resource unit according to the final optimization recommendation and sending the RCO token, via the network interface circuitry, to the host interface.

A product for optimizing the resource configuration provisioned on the service resource unit for a cloud-based search data analytics service may include machine-readable media other than a transitory signal and instructions stored on the machine-readable media. The instructions may, when executed, cause a machine to, at network interface circuitry, receive resource utilization tracking data and resource configuration data of the service resource unit. The instructions may cause the machine to, at optimization circuitry in data communication with the network interface circuitry, execute a resource configuration optimization (RCO) stack.

The RCO stack may be executable to obtain computing utilization metrics of computing capacity provisioned to the service resource unit based on the resource utilization tracking data and generate a computing capacity rightsizing recommendation on the computing capacity based on the computing utilization metrics. The RCO stack may be further executable to obtain memory utilization metrics of memory capacity provisioned the service resource unit based on the resource utilization tracking data and generate a memory capacity rightsizing recommendation on the memory capacity based on the memory utilization metrics. The RCO stack may be further executable to determine a recommended instance type for the service resource unit based on the computing capacity rightsizing recommendation and the memory capacity rightsizing recommendation; obtain an actual used storage volume based on the resource configuration data; perform a storage volume check on the service resource unit based on the computing capacity rightsizing recommendation, the memory capacity rightsizing recommendation, and the actual used storage volume, to obtain a storage volume check result; and determine whether to accept the recommended instance type as a final optimization recommendation based on the storage volume check result, the computing capacity rightsizing recommendation, and the memory capacity rightsizing recommendation. The RCO stack may be further executable to, in response to the acceptance, generate a RCO token to include instructions executable by a host interface to optimize the resource configuration of the service resource unit according to the final optimization recommendation and send the RCO token, via the network interface circuitry, to the host interface.

Advantageously, the systems and methods described below may facilitate to optimize the performance of the service resource unit by making comprehensive recommendations on resource configuration of the service resource unit, including computing capacity rightsizing recommendations, memory capacity rightsizing recommendations, storage volume type recommendations, and storage volume size recommendations. This optimization may ensure more efficient use of CPU and RAMs resources and more efficient storage allocation, faster data retrieval rates, lower latency. The recommended resource configuration may be determined based on multiple historical resource utilization metrics including computing utilization metrics, memory utilization metrics, storage utilization metrics, input/output (I/O) utilization metrics including I/O operation rate such as IOPS and I/O throughput rate, as well as constraints on the resource capacities along with pricing information.

Additionally, before determining the final optimization recommendation on the resource configuration of the service resource unit, the systems and methods may further perform storage volume check and network payload check to ensure that the final optimization recommendation may fulfill the overall performance requirements of the service resource unit. The systems and methods are further described in the drawings, the descriptions, and the claims.

BRIEF DESCRIPTION OF THE DRAWINGS

The present disclosure may be better understood with reference to the following drawings and description. The components in the figures are not necessarily to scale. Moreover, in the figures, like-referenced numerals designate corresponding parts throughout the different views.

FIG. 7 shows an exemplary system execution environment for the resource configuration optimization stack.

DETAILED DESCRIPTION

Figure 1:
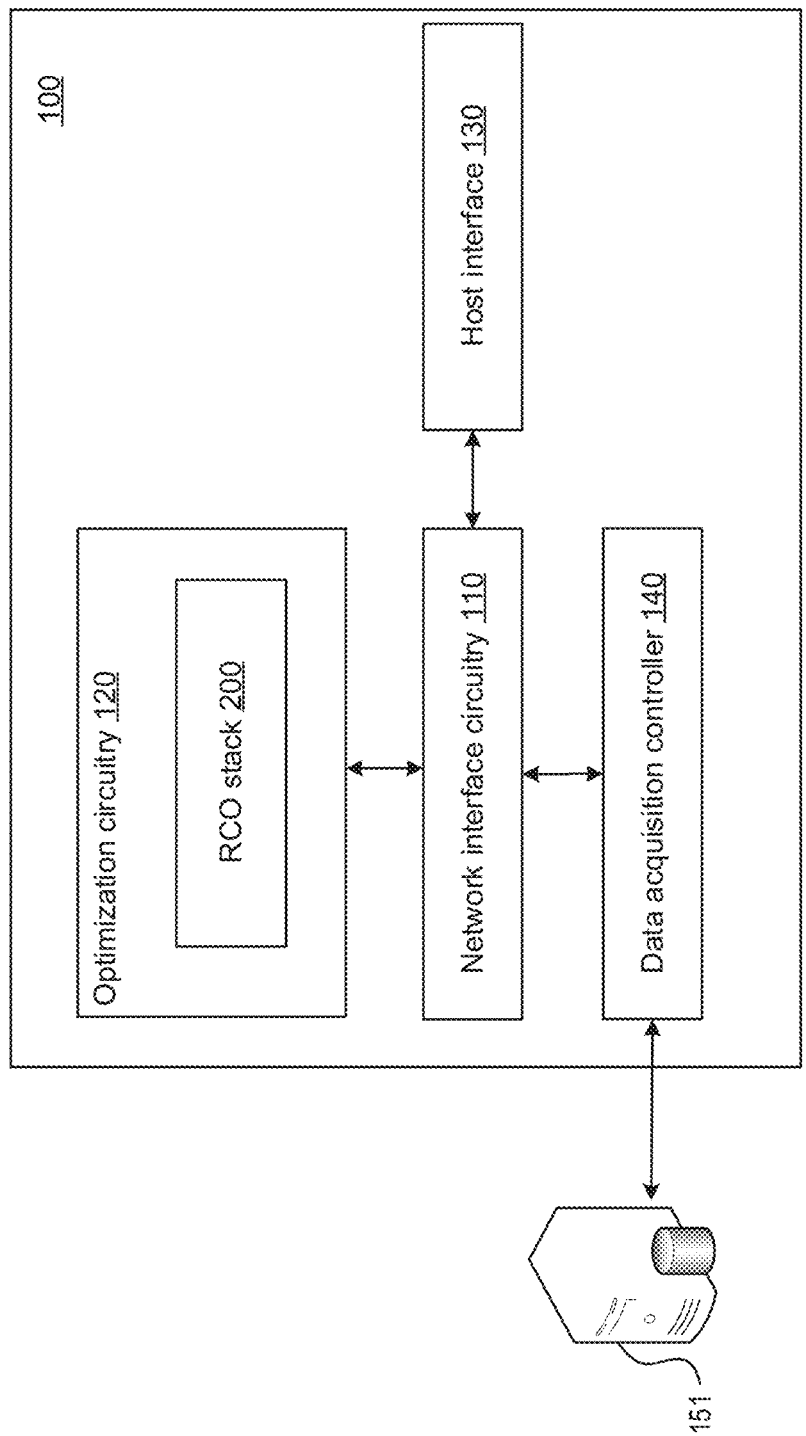
FIG. 1 shows an exemplary system for optimizing resource configuration of a service resource unit in accordance with an embodiment.

Cloud-based scalable distributed search data analytics service, such as Amazon® Elasticsearch™ Service, provides search and analytics engine for use cases such as log analytics, real-time application monitoring, and click stream analytics. The cloud-based search data analytic service may include multiple service resource units such as service clusters and service nodes. A service cluster or cluster may represent a collection of service nodes that together hold the entire data. The cluster may provide distributed indexing, high availability and search capabilities across all service nodes. A service node or node may be a single server in a cluster, which stores data and participates in the cluster's indexing and search capabilities.

In the cloud-based search data analytic service, such as Amazon© Elasticsearch™ Service, an index may represent a collection of documents and be identified by a name. The index name may be used to perform indexing, search, update and delete operations against the documents in the index. The index may be subdivided into multiple pieces called shards. A shard may be hosted on a node within a cluster. Additionally, the index shard may have one or more copies called replica shard or replicas.

A resource configuration for a service resource unit may include, for example, configuration information on computing capacity, memory capacity, storage capacity, I/O capacity such as an operation rate and a throughput rate, and a consumption metric. The computing capacity may, for example, include the number of processing units such as central processing units (CPUs) and processing performance of the CPUs. The memory capacity may, for example, include the number of memory units such as random access memories (RAMs), the volume of the RAMs, and the processing performance of the RAMs. The storage capacity may, for example, include the volume size of storage and storage volume type. The storage volume type may, for example, include solid-state drive (SSD)-based volume type and hard disk drive (HDD)-based volume type. The SSD-based volume type may, for example, include general purpose SSD such as gp2 in the Amazon® Elasticsearch™ Service and provisioned IOPS SSD such as io1 in the Amazon® Elasticsearch™ Service. The HDD-based volume type may, for example, include the throughput optimized HDD such as st1 in the Amazon® Elasticsearch™ Service and the cold HDD such as sc1 in the Amazon® Elasticsearch™ Service. Each of the storage volume types may be equipped with different volume size, maximum IOPS, and maximum throughput, and thus is suitable for different use cases. Thus, the storage volume type may be representative of the I/O capacity provisioned on a service resource unit. The exemplary predetermined storage volume types are listed in Table 1.

TABLE 1

| | Predetermined Storage volume types | | | |
|---|---|---|---|---|
| | SSD | | HDD | |
| Storage volume type | General Purpose SSD gp2 | Provisioned IOPS SSD io1 | Throughput Optimized HDD st1 | Cold HDD sc1 |
| Use cases | Low-latency interactive apps | I/O-intensive database workloads | Big data Data Warehouses Log Processing | Throughput-oriented storage for data that is infrequently accessed scenarios where the lowest storage cost is important |
| Volume size | 1 GiB-16 TiB | 4 GiB-16 TiB | 125 GiB-16 TiB | 125 GiB-16 TiB |
| Max IOPS per volume | 16000 KiB I/O | 64,000 KiB I/O | 500 MiB I/O | 250 MiB I/O |
| Max throughput per volume | 250 MiB/s | 1,000 MiB/s | 500 MiB/s | 250 MiB/s |

The system disclosed herein may optimize the resource configuration of the service resource unit. In an implementation, the resource configuration may be optimized, for example, by rightsizing the computing capacity, the memory capacity, the storage capacity, the operation rate, and/or the throughput rate, thereby assuring more efficient service resource allocation and more cost-effective use of the service resources including, for example, CPU, RAM, and hard disk.

FIG. 1 illustrates an example service resource unit optimization system 100 for optimizing resource configuration of a service resource unit. The system 100 may include a network interface circuitry 110, an optimization circuitry 120, a host interface 130, and a data acquisition controller 140. The network interface circuitry 110 may communicate with the optimization circuitry 120, the host interface 130, and the data acquisition controller 140.

The data acquisition controller 140 may obtain resource utilization tracking data and resource configuration data from data sources 151. The data sources 151 may include for example, resource utilization database and resource configuration files, service resource unit expenditure files, or other data sources. The resource utilization tracking data may include historical utilization data for individual resources of the service resource unit such as computing capacity, memory capacity, storage capacity and I/O capacity. The I/O capacity may include the operation rate, such as I/O operations per second (IOPS) and the throughput rate. The historical resource utilization data may implicate historical resource utilization metrics that are indicative of resource utilization for the service resource unit. In some implementations, the historical resource utilization metrics may include computing utilization metrics, memory utilization metrics and I/O utilization metrics.

The network interface circuitry 110 may communicate with the data acquisition controller 140 to receive the resource utilization tracking data and resource configuration data. The optimization circuitry 120 may execute the resource configuration optimization (RCO) stack 200 to perform prescriptive analysis on the resource utilization tracking data and the resource configuration data to obtain optimization recommendations for the service resource unit. The functions of the RCO stack 200 will be described in detail later with reference to FIG. 2. During execution of the RCO stack 200, the optimization circuitry 120 may generate a RCO token that may, for example, include instructions to optimize the resource configuration of the service resource unit according to a final optimization recommendation. The network interface circuitry 110 may send the RCO token to the host interface 130. The host interface 130 may, for example, include an Application Programming Interface (API) for executing the instructions in the RCO token to perform the resource configuration optimization.

Figure 2:
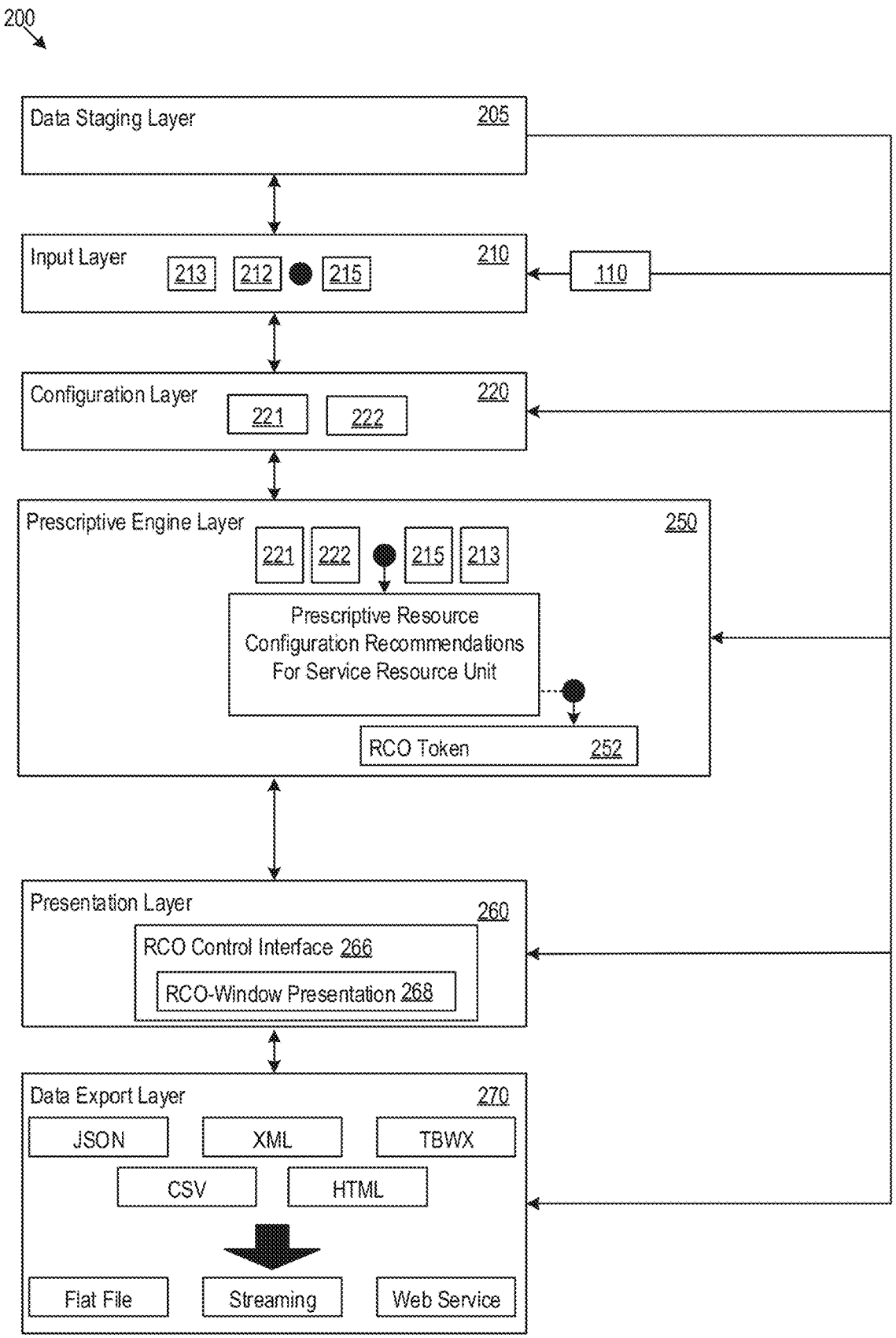
FIG. 2 shows an exemplary multiple-layer resource configuration optimization stack included in a system in accordance with an embodiment.

FIG. 2 shows an example multiple layer RCO stack 200. The resource configuration optimization system described herein may use the RCO stack 200 to prescribe recommendations for a service resource unit of a cloud-based search data analytics service based on analysis of data associated with various resources, such as computing resources, memory resources, storage resources, I/O resources provisioned on the service resource unit. The resource configuration optimization analysis performed by the system may include, for example, re-provisioning service resource units of the cloud-based search data analytics service with corresponding recommended resource configuration.

In this example, the RCO stack 200 may include a data staging layer 205, an input layer 210, a configuration layer 220, a prescriptive engine layer 250, a presentation layer 260, and a data export layer 270. The RCO stack 200 may include a multiple-layer computing structure of hardware and software that may provide prescriptive analytical recommendations (e.g., resource configuration optimization prescriptions for the service resource unit) through data analysis.

A stack may refer to a multi-layered computer architecture that defines the interaction of software and hardware resources at the multiple layers. The Open Systems Interconnection (OSI) model is an example of a stack-type architecture. The layers of a stack may pass data and hardware resources among themselves to facilitate data processing. As one example, for the RCO stack 200, the data staging layer 205 may provide the input layer 210 with storage resources to store ingested data within a database or other data structure. In some implementations, the data staging layer 205 may be deployed as a cloud-based database platform with the capability to process mass data. In an example, an underlying Big Data Lake of the database platform is capable of ingesting data from heterogeneous data sources such as Secured Storage, Hadoop file systems (HDFS) connections, relational databases, flat files, and other data operations. Hence, the data staging layer 205 may provide a hardware resource, e.g., memory resources, to the input layer 210. Accordingly, the multiple-layer stack architecture of the RCO stack 200 may improve the functioning of the underlying hardware.

Figure 3:
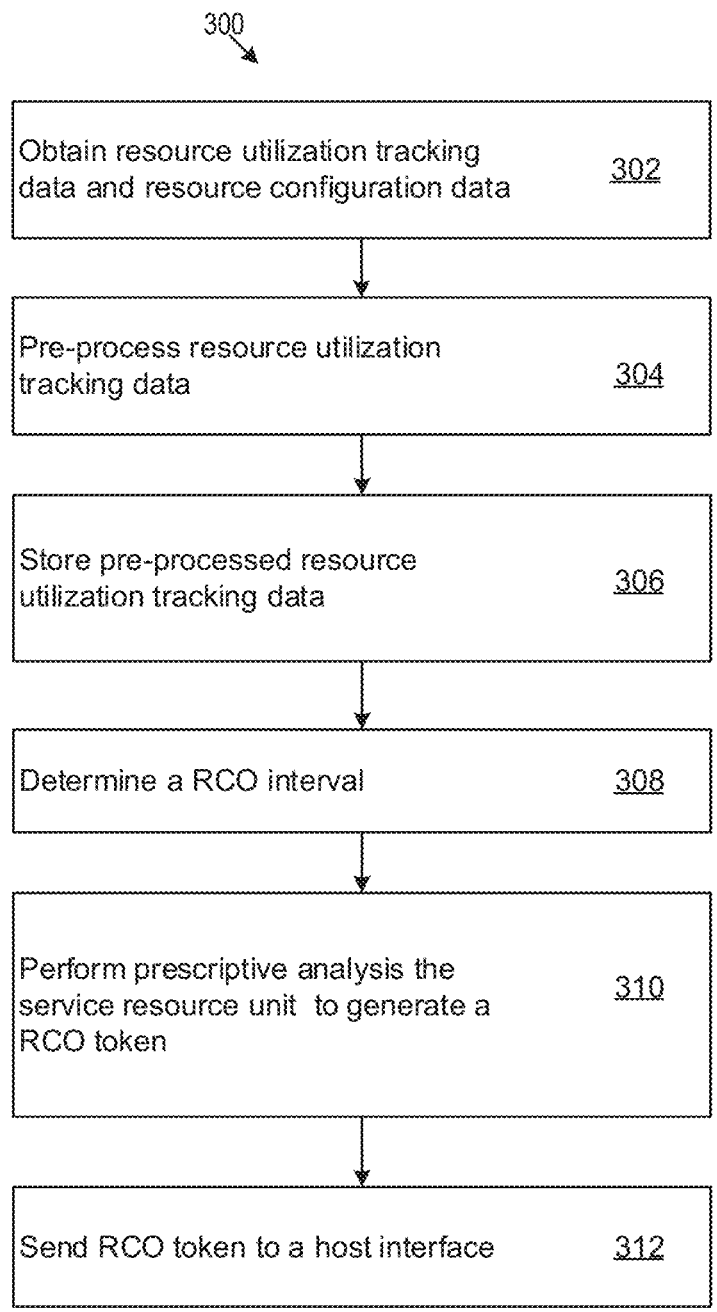
FIG. 3 shows an exemplary resource configuration optimization logic in accordance with an embodiment.

In the following, reference is made to FIG. 2 and an example RCO logic (RCOL) 300 in FIG. 3. It will be appreciated that the logical features of the example RCOL may be implemented in various orders and combinations. For example, in a first implementation, one or more features may be omitted or reordered with respect to a second implementation. At the input layer 210 of the RCO stack 200, the RCOL 300 may obtain resource configuration data 213 of service resource units and resource utilization tracking data 212 of the service resource units as the input data (302). The resource configuration data 213 and the resource utilization tracking data 212 may be received, for example, via the network interface circuitry 110.

Optionally, at the input layer 210, the RCOL 300 may pre-process the resource utilization tracking data 212 (304). In some implementations, the pre-processing may include data transformations on the resource utilization tracking data 212 such as z transformation, log transformation and data minimization. Alternatively or additionally, the pre-processing may treat missing value data in the resource utilization tracking data 212. For example, the missing value data is treated to map NULL to 0. Alternatively or additionally, the pre-processing may filter out the resource utilization tracking data 212 that does not have corresponding resource expenditure data.

The RCOL 300 then may, at the input layer 210, store the pre-processed resource utilization tracking data 215 via a memory operation at the data staging layer 205 (306). In some implementations, the pre-processed resource utilization tracking data 215 may be indexed to speed up query processing.

At the configuration layer 220, the RCOL 300 may determine a RCO interval 221 to optimize the resource configuration of the service resource unit (308). For example, the RCO interval 221 may be predetermined to be periodical or non-periodical (e.g., hourly, six hours, daily, weekly, month-date, and yearly). Alternatively or in addition, the RCO interval 221 may be selected by the system operator. The RCOL 300 may further determine various utilization thresholds 222 to be used in the prescriptive optimization analysis such as computing capacity thresholds, memory capacity thresholds, operation rate thresholds, throughput rate thresholds, and storage capacity thresholds.

At the prescriptive engine layer 250, the RCOL 300 may perform prescriptive analysis on the service resource unit to generate a RCO token for resource configuration optimization recommendations (310). Then, the RCOL 300 may send the RCO token to, for example, the host interface 130 via the network interface circuitry 110 (312).

Figure 4:
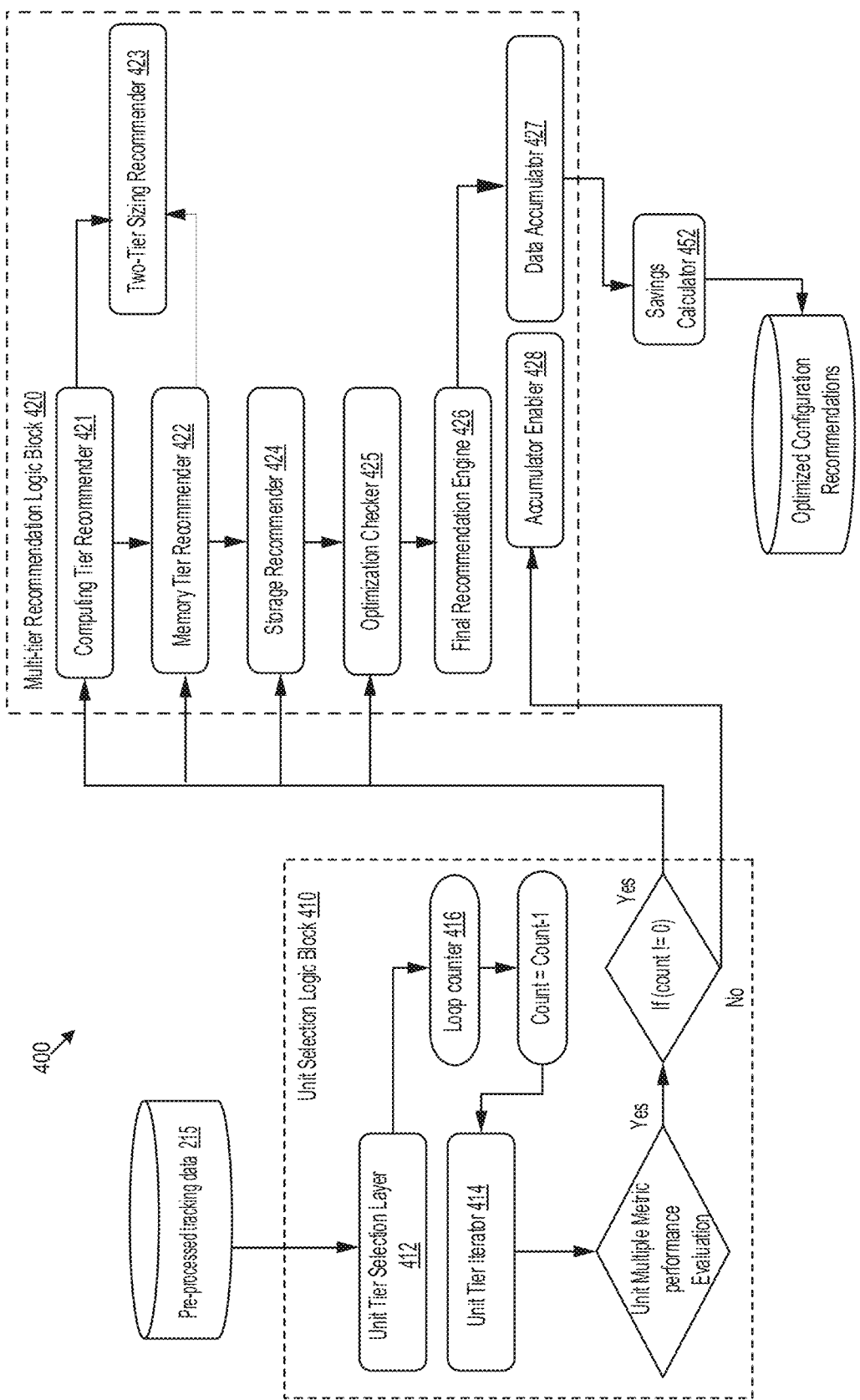
FIG. 4 shows an exemplary system execution implementation for a prescriptive engine layer of the resource configuration optimization stack in accordance with an embodiment.

FIG. 4 is a block diagram example of a service resource unit optimization system 400 illustrating execution implementation for the prescriptive engine layer 250 of the RCO stack 200. Example operation 310 of the RCOL 300 at the prescriptive engine layer 250 will be described with reference to the system 400 of FIG. 4.

The execution of the system 400 may include a unit selection logic block 410 and a multi-tier recommendation logic block 420. The unit selection logic block 410 may include a unit tier selection layer 412, a unit tier iterator 414, and a loop counter 416. The multi-tier recommendation logic block 420 may include a computing tier recommender 421, a memory tier recommender 422, a two-tier sizing recommender 423, a storage recommender 424, an optimization checker 425, a final recommendation engine 426, a data accumulator 427, and an accumulator enabler 428.

At the unit selection logic block 410, the RCOL 300 may select target service resource unit from candidate service resource units such as service nodes and service clusters based on the pre-processed utilization tracking data 215 of the candidate service resource units.

In an implementation, at the unit tier selection layer 412, the RCOL 300 may obtain a utilization time length for a candidate service resource unit and a utilization data missing coefficient for the candidate service resource unit via the data-staging layer 205. The utilization time length may be represented by days and the utilization data missing coefficient may represent the percentage of days for which the utilization data is missing over the utilization time length. Then, the RCOL 300 may select the candidate service resource unit as a target service resource unit for resource configuration optimization if the utilization time length is greater than or equal to a utilization time length threshold and the utilization data missing coefficient is less than a data missing tolerance threshold. The utilization time length threshold may range, for example, from 30 days to 90 days.

For example, the utilization time length threshold is 90 days and the data missing tolerance threshold is 10%. If a service resource unit has 90 days of utilization but only has 83 days of resource utilization tracking data, i.e., 7 days of resource utilization tracking data is missing, the utilization tracking data missing coefficient of the service resource unit is 7.8% (i.e., 7/90). Because the utilization time length of the service resource unit (90 days) is equal to the utilization time length threshold (90 days) and the utilization data missing coefficient of the service resource unit (7.8%) is less than the data missing tolerance threshold (10%), the RCOL 300 may select the service resource unit as a target service resource unit for subsequent resource configuration optimization analysis.

After processing the candidate service resource unit at the service resource unit selector 312, the RCOL 300 may, at the loop counter 416, count the remained candidate service resource units that have yet to be processed. If the count value is greater than zero, the RCOL 300 may iterate the service resource unit selection operation at the unit tier iterator 414 to select target service resource units until all the candidate service resource units have been processed.

Optionally, at the unit selection logic block 410, the RCOL 300 may also calculate the various resource utilization metrics for the service resource unit. For example, the RCOL 300 may calculate the percentile-based utilization values, such as $99^{th}$ and $95^{th}$ percentile utilization values for CPUs, RAMs, hard disk, and write/read IOPS.

Figure 5:
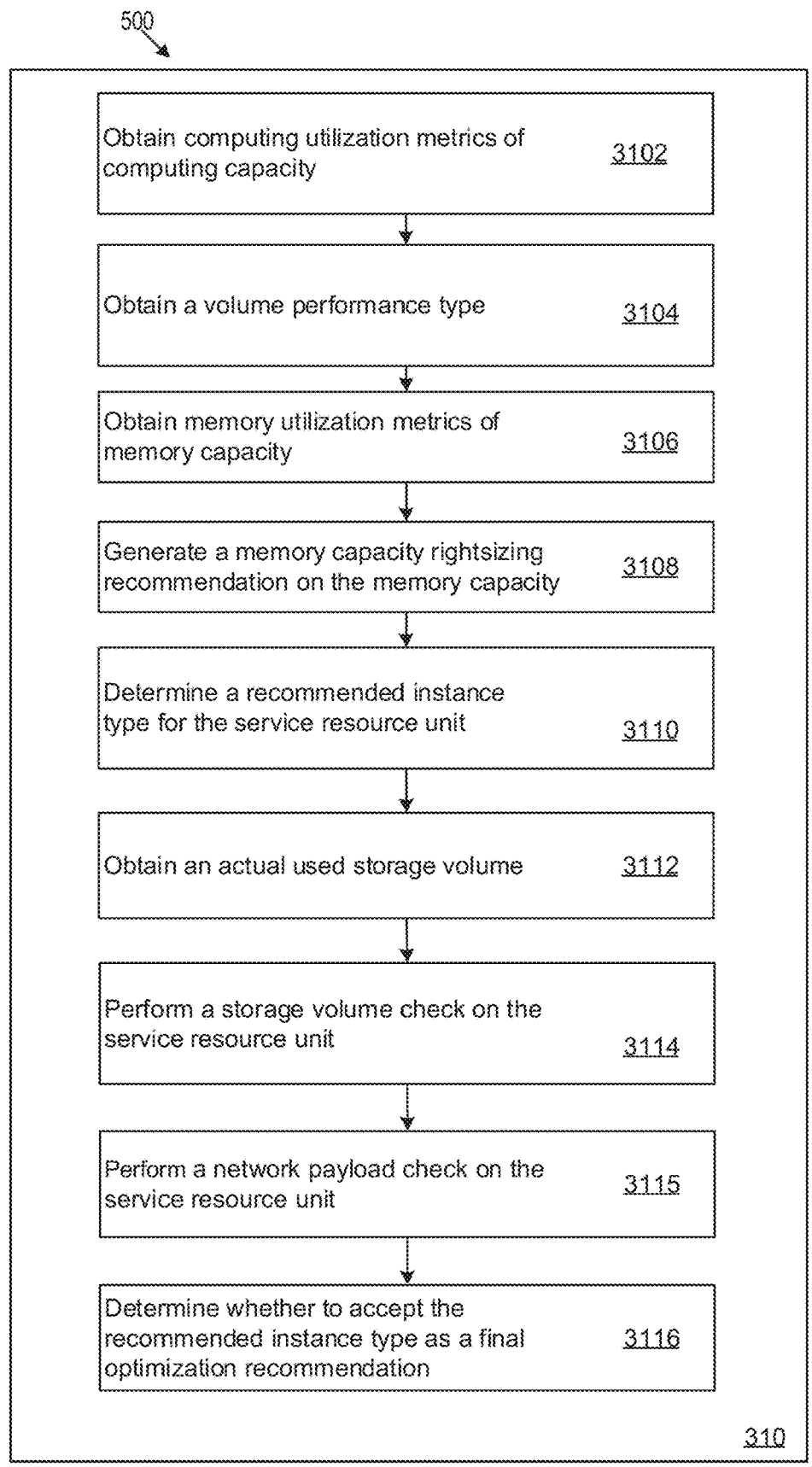
FIG. 5 shows an exemplary resource configuration optimization logic in accordance with an embodiment.

The functions of individual components in the multi-tier recommendation logic block 420 will be described with reference to FIG. 5. At the computing tier recommender 421, the RCOL 300 may obtain computing utilization metrics of computing capacity provisioned to the service resource unit based on the pre-processed resource utilization tracking data 215 (3102) and generate a computing capacity rightsizing recommendation on the computing capacity based on the computing utilization metrics (3104). The computing utilization metrics may include, for example, the percentage value that the CPUs are fully utilized, percentile-based computing utilization value such as $95^{th}$ percentile CPU utilization value and $99^{th}$ percentile CPU utilization value, the maximum CPU utilization value in the pre-processed resource utilization tracking data 215 over the RCO interval.

In an implementation, the RCOL 300 may determine if an application running on the service resource unit is single-threaded based on the pre-processed resource utilization tracking data 215 and the resource configuration data 213. For example, the RCOL 300 may obtain the percentage value that the CPUs of the service resource unit are fully utilized and the $95^{th}$ percentile CPU utilization value from the computing utilization metrics and obtain the number of CPUs in the service resource unit from the resource configuration data 213. Then, the RCOL 300 may determine if the application is single-threaded, for example, using the Equation 1a.

$$\text{Single-Threaded Flag } (\alpha) = \text{If } ((\beta \geq \gamma) \text{ \& } (\delta \leq ((1/\varepsilon) + 0.1*(1/\varepsilon)))) \text{ then "YES" else "NO"} \quad \text{Equation 1a}$$

Where,
$\beta$=% of 100% CPU values in the given utilization array
$\gamma$=Peak utilization threshold
$\delta = 95^{th}$ CPU percentile value
$\varepsilon$=Number of CPUs In response to the determination that the application is not single-threaded, the RCOL 300 may obtain maximum computing utilization value and percentile-based utilization value from the computing utilization metrics and generate the computing capacity rightsizing recommendation based on the maximum computing utilization value and percentile-based computing utilization value. The computing capacity rightsizing recommendation may include, for example, an indication of whether to rightsize the computing capacity. The indication may include a processing unit upsize flag or a processing unit downsize flag. In an example, the RCOL 300 may generate the processing unit downsize flag, for example, using Equation 1b.

$$\text{Downsize flag } (\zeta_{CPU}) = \text{If } (\alpha = \text{"NO" If Else } ((\eta_{CPU} \leq 0.4) \text{ OR } [\{(\eta_{CPU} > 0.4) \text{ \& } (\delta \leq 0.1)\}] \text{ then "YES" else "NO"})) \quad \text{Equation 1b}$$

Where,
$\zeta_{CPU}$=CPU downsize flag
$\alpha$=Single-threaded application flag
$\delta = 95^{th}$ CPU utilization percentile value
$\eta_{CPU}$=Maximum CPU utilization in the historical utilization array Alternatively or additionally, the RCOL 300 may generate the processing unit upsize flag, for example, using Equation 1c.

$$\text{Upsize flag } (\lambda_{CPU}) = \text{If } (\alpha = \text{"No" If Else } (\delta \geq 0.9, \text{"Yes","No"})) \quad \text{Equation 1c}$$

Where,
$\lambda_{CPU}$=CPU upsize flag
$\alpha$=Single-threaded application flag
$\delta = 95^{th}$ CPU percentile value The computing capacity rightsizing recommendation may further include a recommended number of processing units such as CPUs. In an example, in response to the processing unit upsize flag or the processing unit downsize flag, the RCOL 300 may recommend a predetermined one-step upsize or downsize for the processing units and obtain the number of processing units corresponding to the one-step higher size and the one-step lower size, as shown in Equations 1d and 1e.

$$\text{One-step downsize CPUs } (\mu) = \text{If } (\zeta_{CPU} = \text{"YES" then } \nu \text{ else 0)} \quad \text{Equation 1d}$$

$$\text{One-step upsize CPUs } (\xi) = \text{If } (\lambda_{CPU} = \text{"YES" then } \pi \text{ else 0)} \quad \text{Equation 1e}$$

Where,
$\nu$=Number of CPUs corresponding to one-step lower size
$\pi$=Number of CPUs corresponding to one-step higher size
$\zeta_{CPU}$=One-step downsize flag
$\lambda_{CPU}$=One-step upsize flag Then, the RCOL 300 may determine a final recommended number of processing units from the one-step downsize number of processing units and the one-step upsize number of processing units, for example, using the Equation 1f.

$$\text{Final CPU Recommendation } (\sigma) = \text{Minimum } (\mu, \tau) > 0 \quad \text{Equation 1f}$$

Where,
$\mu$=the one-step downsize number of processing units
$\xi$=the one-step upsize number of processing units Then, the RCOL 300 may obtain a recommended computing capacity tier based on the final recommended number of processing units. For example, the RCOL 300 may use the final recommended number of processing units as an index to search for the recommended computing capacity tier in a predefined computing capacity tier table.

At the memory tier recommender 422, the RCOL 300 may obtain memory utilization metrics of memory capacity provisioned to the service resource unit based on the resource utilization tracking data (3106) and generate a memory capacity rightsizing recommendation on the memory capacity based on the memory utilization metrics (3108). The memory utilization metrics may include, for example, percentile-based memory utilization value such as $99^{th}$ percentile RAM utilization value and the maximum memory utilization value in the pre-processed resource utilization tracking data 215 over the RCO interval.

In an implementation, the RCOL 300 may obtain maximum memory utilization value and a plurality of percentile-based memory utilization values over non-overlapping operational time ranges from the memory utilization metrics. For example, the percentile-based memory utilization values may include $99^{th}$ percentile RAM utilization values for the past 30 days, the past 30 to 60 days, and the past 60 to 90 days. Then, the RCOL 300 may perform weighted sum of the plurality of percentile-based memory utilization values to obtain a weighted sum value, for example, using the Equation 2a.

$$\text{Weighted Memory Utilization Value } (u_{weighted}) = (u_{0\text{-}30}*0.6) + (u_{30\text{-}60}*0.25) + (u_{60\text{-}90}*0.15) \quad \text{Equation 2a}$$

Where,
$u_{0\text{-}30} = 99^{th}$ percentile memory utilization value for the past 30 days
$u_{30\text{-}60} = 99^{th}$ percentile memory utilization value for the past 60 to 90 days
$u_{60\text{-}90} = 99^{th}$ percentile memory utilization value for the past 60 to 90 days The RCOL 300 may generate the memory capacity rightsizing recommendation based on the maximum memory utilization value and the weighted sum value. The memory capacity rightsizing recommendation may include an indication of whether to rightsize the memory capacity. The indication may include a memory upsize flag or a memory downsize flag. In an example, the RCOL 300 may generate the memory downsize flag, for example, using Equation 2b.

$$\text{Downsize flag } (\zeta_{RAM}) = \text{If } ((\eta_{RAM} <= 0.4) \text{ OR } [\{(\eta_{RAM} > 0.4) \& (u_{weighted} <= 0.1)\}] \text{ then "YES" else "NO"}) \quad \text{Equation 2b}$$

Where,
$\zeta_{RAM}$=Memory downsize flag
$u_{weighted}$=Weighted 99th percentile memory utilization value
$\varepsilon_{RAM}$=Current memory size
$\eta_{RAM}$=Maximum memory utilization in the historical utilization array Alternatively or additionally, the RCOL 300 may generate the upsize flag, for example, using Equation 2c.

$$\text{Upsize flag } (\lambda_{RAM}) = \text{If } (u_{weighted} >= 0.8, \text{"Yes","No"}) \quad \text{Equation 2c}$$

Where,
$\lambda_{RAM}$=Memory upsize flag
$u_{weighted}$=Weighted 99th percentile memory utilization value The memory capacity rightsizing recommendation may further include a recommended number of memory units such as RAMs. In an example, in response to the memory upsize flag or the memory downsize flag, the RCOL 300 may recommend a predetermined one-step upsize or downsize for the memory units and obtain the number of memory units corresponding to the one-step higher size and the one-step lower size, as shown in Equations 2d and 2e.

$$\text{One-step downsize RAM } (\mu_{RAM}) = \text{If } (\zeta_{RAM} = \text{"YES" then } \nu_{RAM} \text{ else } 0)) \quad \text{Equation 2d}$$

$$\text{One-step upsize RAM } (\xi_{RAM}) = \text{If } (\lambda_{RAM} = \text{"YES" then } \pi_{RAM} \text{ else } 0)) \quad \text{Equation 2e}$$

Where,
$\nu_{RAM}$=Number of RAMs corresponding to one-step lower size
$\pi_{RAM}$=Number of RAMs corresponding to one-step higher size
$\xi_{RAM}$=Memory downsize flag
$\lambda_{RAM}$=Memory upsize flag Then, the RCOL 300 may determine a final recommended number of memory units from the one-step downsize number of memory units and the one-step upsize number of memory units, for example, using the Equation 2f.

$$\text{Final Memory Recommendation } (\sigma_{RAM}) = \text{Minimum } (\mu_{RAM}, \xi_{RAM}) > 0 \quad \text{Equation 2f}$$

Where,
$\mu_{RAM}$=the one-step downsize number of memory units
$\xi_{RAM}$=the one-step upsize number of memory units Then, the RCOL 300 may obtain a recommended memory capacity tier based on the final recommended number of memory units. For example, the RCOL 300 may use the final recommended number of memory units as an index to search for the recommended memory capacity tier in a predefined memory capacity tier table.

At the two-tier sizing recommender 423, the RCOL 300 may determine a recommended instance type for the service resource unit based on the computing capacity rightsizing recommendation and the memory capacity rightsizing recommendation (3110). The instance type may determines the hardware of the host computer used for the service resource unit. Each instance type may offer different compute, memory, and storage capabilities, and is grouped in an instance family based on these capabilities. The cloud-based search data analytics service may provide a wide selection of instance types for different use cases. In an example, the RCOL 300 may identify the candidate instance types that fulfill the recommended computing capacity tier in the computing capacity rightsizing recommendation and the recommended memory capacity tier in the memory capacity rightsizing recommendation. Then, the RCOL 300 may select the instance type with lowest expenditure among the candidate instance types as the recommended instance type, for example, using Equation 3.

$$\Omega = \text{If } [(\tau_{CPU} \& \tau_{RAM} = \text{YES THEN } (\chi_{Instance} \& \xi_{Instance}) \text{ ELSE "No recommendation"}] \quad \text{Equation 3}$$

Where,
$\Omega$=Recommended instance type
$\tau_{CPU}$=Recommended CPU tier
$\tau_{RAM}$=Recommended RAM tier
$\chi_{Instance}$=Instance with the minimum pricing
$\xi_{Instance}$=Latest Instance generation At the storage recommender 424, the RCOL 300 may obtain a storage volume type of the service resource unit from the resource configuration data 213. The storage volume type may include SSD-based types and HDD-based types as discussed above in Table 1. The storage volume type may be representative of I/O capacity provisioned to the service resource unit. The RCOL 300 may obtain I/O utilization metrics of the I/O capacity provisioned to the service resource unit based on the pre-processed resource utilization tracking data 215. The I/O utilization metrics may include I/O operation rate and throughput rate. Then, RCOL 300 may generate a volume type recommendation for the service resource unit based on the storage volume type and the I/O utilization metrics.

Storage Transition Recommendation Between SSD-Based Types

The volume type recommendation may include transition recommendation between SSD-based types such as between gp2 and io1. In an implementation, RCOL 300 may obtain a maximum I/O operation rate and a percentile-based I/O operation rate from the I/O utilization metrics, determine a recommended I/O operation rate for the service resource unit based on the maximum I/O operation rate and the percentile-based I/O operation rate, and obtain an I/O block size based on the volume type of the service resource unit. Then, the RCOL 300 may determine a recommended throughput rate based on the recommended I/O operation rate and the I/O block size of the service resource unit; and generate the volume type recommendation based on the recommended I/O operation rate, the recommended throughput rate, a provisioned I/O operation rate on the service resource unit, and a provisioned throughput rate on the service resource unit. The I/O block size may represent a unit of I/O data stream. In an example, the block size may be equal to the throughput rate divided by OPS.

In an example, the volume type recommendation is whether to recommend the transition from io1 to gp2 for the service resource unit. The ROL 300 may generate the volume type recommendation using example routine in Table 2.

TABLE 2

Example routine for generating volume type
transition recommendation from io1 to gp2

| | |
|---|---|
| Example Routine | Recommended IOPS (gp2) = <br> If (max_IOPS < (ω/1.1) then (If (α <= 1.5 then (If β < ω then β else ω)) else (If γ < ω then γ else ω)) <br> else "consider IOPS right-sizing for optimization or other volume types") <br> where, <br> α = Max IOPS/99$^{th}$ percentile IOPS <br> β = 99$^{th}$ percentile IOPS rounded-up to the nearest 100$^{th}$ multiple after provisioning 10% buffer on 99$^{th}$ percentile IOPS value <br> γ = Max IOPS rounded-up to the nearest 1000 multiple after provisioning 10% buffer on Max IOPS value <br> ω = Max IOPS per gp2 volume <br> Recommended Throughput (gp2) = Recommended IOPS * I/O block-size for gp2 volume <br> Transition Flag = <br> If [((Recommended IOPS >= Provisioned IOPS) AND (Recommended Throughput >= Provisioned Throughput)) then "Recommend Transition" else "Do not transition"] |

Optionally, the volume type recommendation may include a recommended storage volume for the service resource unit. The RCOL 300 may determine the recommended storage volume based on the actual used storage volume and the recommended I/O operation rate. For example, if the volume type recommendation recommends the storage transition from io1 to gp2, the RCOL 300 may determine the recommended storage volume size for gp2 using the example routine in Table 3.

TABLE 3

Example routine for determining recommended storage volume size for gp2

| | |
|---|---|
| Example Routine | Recommended Volume for gp2 (GB) = <br> If (π >= 1.5 then (If Ω < ω then Ω else ω) else "Current provisioned Volume") <br> where, <br> π = Ω/(Actual volume used (GB)) <br> Ω = Recommended IOPS (gp2)/ε (gp2) <br> ε (gp2) = (IOPS/Volume in GB) standard ratio for the gp2 volume class <br> ω = Max IOPS per gp2 volume |

Storage Transition Recommendation to HDD-Based Types

The volume type recommendation may also include transition recommendation to HDD-based types such as from SSD-bases types to HDD-based types and between HDD-based types. To generate the transition recommendation to HDD-based types, the RCOL 300 may first need to obtain a normalized baseline throughput rate based on the volume type of the service resource unit. In an implementation, the RCOL 300 may obtain a baseline I/O operation rate based on the volume type of the service resource unit, determine burst balance information of the service resource unit based on the baseline I/O operation rate, normalizing the baseline I/O operation rate based on the burst balance information, and calculate the normalized baseline throughput rate based on the normalized baseline I/O operation rate. The burst balance information may, for example, include information on the burst credit of the storage volumes in the service resource unit and replenishment of the burst credit. The burst credit may be considered as an I/O resources ideal for processing bursty workloads such as daily reporting and recurring extraction, transformation, and loading (ETL) jobs. In an example, the burst credit may be replenished at the rate of 3 IOPS per gibibytes (GiB) per second.

In an example, the volume type of the service resource unit is gp2, the RCOL 300 may obtain the normalized baseline throughput rate using the example routine in Table 4.

TABLE 4

Example routine for obtaining normalized baseline throughput rate for gp2 volume

| | |
|---|---|
| Example Routine | IOPS credits (Ø) = 5.4 Million <br> Time to fill empty credit balance (к) = Ø/Baseline IOPS (gp2) <br> Maximum burst duration @ 3,000 IOPS (seconds) (σ) = Ø/(3000 − ε(gp2)) <br> Normalized Baseline IOPS (Σ(gp2)) = <br> If (β(gp2) < 3000 then (((к/(к + σ))*3000) + ((1 − (к/(к + σ)))* β(gp2)) else β(gp2)) |

TABLE 4-continued

Example routine for obtaining normalized baseline throughput rate for gp2 volume Resulting Normalized Baseline Throughput (gp2) also known as $\delta(gp2) =$
$\Sigma(gp2) *$ I/O Block-size for gp2 volume
Where
$\varepsilon$ (gp2) = (IOPS/Provisioned Volume in GB)*Recommended Volume standard
IOPS/Provisioned ratio for the gp2
$\beta(gp2) = 99^{th}$ percentile IOPS for the given gp2 Volume Then, the RCOL 300 may obtain a maximum through rate and a percentile-based throughput rate from the I/O utilization metrics, determine a recommended throughput rate based on the maximum through rate, the percentile-based throughput rate, and the normalized baseline throughput rate. The RCOL 300 may obtain an I/O block size based on the volume type of the service resource unit and determine a recommended I/O operation rate based on the recommended throughput rate and the I/O block size. The RCOL 300 may generate the volume type recommendation based on the recommended I/O operation rate, the recommended throughput rate, a provisioned I/O operation rate on the service resource unit, and a provisioned throughput rate on the service resource unit.

In an example, the volume type recommendation is whether to recommend the transition from gp2 to st1 for the service resource unit. The RCOL 300 may generate the volume type recommendation using example routine in Table 4.

TABLE 4

Example routine for generating volume type
transition recommendation from gp2 to st1

| | |
|---|---|
| Example Routine | Recommended Throughput (HDD) = <br> If ($\alpha <= 1.5$ then (If $\beta < \omega$ then $\beta$ else $\delta(gp2)$)) <br> else (If $\gamma < \omega$ then $\gamma$ else $\delta(gp2)$))) <br> where, <br> $\alpha$ = Max Throughput/$99^{th}$ percentile throughput <br> $\beta = 99^{th}$ percentile throughput rounded-up to the nearest $10^{th}$ multiple after provisioning 10% buffer on $99^{th}$ percentile throughput value <br> $\gamma$ = Max throughput rounded-up to the nearest $10^{th}$ multiple after provisioning 10% buffer on Max throughput value <br> $\delta(gp2)$ = Normalized baseline throughput (gp2) <br> $\omega$ = Max IOPS per gp2 volume <br> Resulting Recommended IOPS (HDD) = <br> Recommended Throughput/Block-size for st1 volume <br> Transition Flag = If [((Recommended IOPS >= Provisioned IOPS) AND (Recommended Throughput >= Provisioned Throughput)) then "Recommend Transition" else "Do not transition"] |

Optionally, the volume type recommendation may include a recommended storage volume for the service resource unit. The RCOL 300 may determine the recommended storage volume based on the actual used storage volume and the recommended throughput rate. For example, if the volume type recommendation recommends the storage transition from gp2 to st1, the RCOL 300 may determine the recommended storage volume size for st1 using the example routine in Table 5.

TABLE 5

Example routine for determining recommended storage volume size for st1

| | |
|---|---|
| Example Routine | Recommended Volume for st1 (GB) = <br> If ($\pi >= 1.5$ then (If $\Omega < \omega$ then $\Omega$ else $\omega$) <br> else "Current provisioned Volume") <br> where, <br> $\pi = \Omega$/(Actual volume used (GB)) <br> $\Omega$ = Recommended throughput (st1)/$\varepsilon$ (st1) <br> $\varepsilon$ (st1) = (Throughput/Volume in GB) standard ratio for the st1 volume <br> $\omega$ = Max IOPS per gp2 volume |

At the optimization checker 425, the RCOL 300 may obtain an actual used storage volume based on the resource configuration data (3112). In an implementation, the RCOL 300 may calculate the actual used storage volume based on source data size, the number of replicas, indexing overhead, and system reserved storage volume in the service resource unit. The indexing overhead may, for example, represent a buffer of indexing. For example, the RCOL 300 may calculating the actual used storage volume using Equation 4.

$$\text{Actual Volume Used } \tau = \sigma + (1*\Psi) \quad \text{Equation 4}$$

Where,
$\alpha = \Phi*(1+\kappa)*(1+\lambda)*(1-v)*(1-\varepsilon)$
$\Phi$=Source data size (GB)
$\kappa$=Number of replicas
$\lambda$=Indexing overhead %
$v$=Linux reserved space
$\varepsilon$=Search data analytics service overhead (E.g. 20%)

Then, the RCOL 300 may perform a storage volume check on the service resource unit based on the computing capacity rightsizing recommendation, the memory capacity rightsizing recommendation, and the actual used storage volume, to obtain a storage volume check result (3114). In an example, where the computing capacity rightsizing recommendation may have the corresponding recommended computing capacity tier and the memory capacity rightsizing recommendation may have the corresponding recommended memory capacity tier, the RCOL 300 may perform the storage volume check using Equation 5a.

$$\text{VolumeCheck1=If } [((\tau_{CPU} \& \tau_{RAM})=\text{YES}) \& [\tau+\theta*\tau] \\ <=\delta(\omega) \text{ THEN "Downsize" ELSE "No Action"}] \quad \text{Equation 5a}$$

Where,
$\tau_{CPU}$=Recommended CPU Tier
$\tau_{RAM}$=Recommended RAM Tier
$\tau$=Actual volume used
$\theta$=Volume buffer
$\delta$=Storage volume threshold
$\omega$=Maximum available storage volume size for the recommended storage volume multiplied by a factor, e.g., 1.5.

In another example, where the computing capacity rightsizing recommendation and the memory capacity rightsizing recommendation does not have corresponding recommended computing capacity tier and memory capacity tier, the RCOL 300 may perform the storage volume check using Equation 5b.

$$\text{VolumeCheck1=If } [((\tau_{CPU} \& \tau_{RAM})=\text{"No recommendation"}) \& [\tau+\theta*\tau]>\mu(\beta) \text{ THEN "Downsize"} \\ \text{ELSE "No Action"}] \text{ Equation 5b}$$

Where,
$\tau$=Actual volume used
$\theta$=Volume buffer
$\mu$=Storage volume threshold
$\beta$=Provisioned volume At the final recommendation engine 426, the RCOL 300 may determine whether to accept the recommended instance type as a final optimization recommendation based on the storage volume check result, the computing capacity rightsizing recommendation, and the memory capacity rightsizing recommendation (3116). In an example, the service resource unit is a service node. Where the computing capacity rightsizing recommendation and the memory capacity rightsizing recommendation have corresponding recommended computing capacity tier and recommended memory capacity tier, the RCOL 300 may determine whether to accept the recommended instance type using Equation 7a $$\text{Final\_Recommendation (Node Level)=If} \\ ((\text{VolumeCheck1="Downsize"}) \& ((\tau_{CPU} \& \\ \tau_{RAM})=\text{YES}) \text{ THEN "Accept Recommendation"} \\ \text{ELSE "No action"}) \quad \text{Equation 7a}$$

Where the computing capacity rightsizing recommendation and the memory capacity rightsizing recommendation have corresponding recommended computing capacity tier and recommended memory capacity tier, the RCOL 300 may determine whether to rightsize the storage volume using Equation 7b $$\text{Final\_Recommendation (Node Level)=If} \\ ((\text{VolumeCheck2="Upsize Only Volume"}) \& \\ ((\tau_{CPU} \& \tau_{RAM})=\text{"NO"}) \text{ THEN "Upsize Volume} \\ \text{Only" ELSE "No Action"}) \quad \text{Equation 7b}$$

Alternatively or additionally, at the optimization checker 425, the RCOL 300 may perform a network payload check on the service resource unit based on the recommended instance type, to obtain a network payload check result (3115). For example, the RCOL 300 may perform the network payload network using Equation 6.

$$\text{NetworkPayloadCheck=If } ([\tau_{MaxPayload}+ \\ \mu_{Ntwrk}*\tau_{MaxPayload}]<=\rho(\Omega_{MaxPayload}) \text{ THEN} \\ \text{"Downsize" ELSE "No Action"}) \quad \text{Equation 6}$$

Where,
$\tau_{TMaxPayload}$=Max network payload
$\mu_{Ntwrk}$=Payload buffer
$\rho$=Payload threshold
$\Omega_{MaxPayload}$=Max payload for recommended instance type At the final recommendation engine 426, the RCOL 300 may determine whether to accept the recommended instance type as a final optimization recommendation based on the network payload check result, the storage volume check result, the computing capacity rightsizing recommendation, and the memory capacity rightsizing recommendation (3116). In an example, the service resource unit is a service node. Where the computing capacity rightsizing recommendation and the memory capacity rightsizing recommendation have corresponding recommended computing capacity tier and recommended memory capacity tier, the RCOL 300 may determine whether to accept the recommended instance type using Equation 7c $$\text{Final\_Recommendation (Node Level)=If} \\ ((\text{VolumeCheck1="Downsize"} \& \\ \text{NetworkPayloadCheck="Downsize"}) \& ((\tau_{CPU} \\ \& \tau_{RAM})=\text{YES})$$

THEN "Accept Recommendation" ELSE "No action") Equation 7c

Similarly, where the service resource unit is a service cluster, the RCOL 300 may make the final recommendation determination based on average values of metrics of the nodes in the cluster. For example, the average recommended computing capacity tier and the average recommended memory capacity tier is less than or equal to a predetermined computing/memory capacity tier threshold for the service cluster, the RCOL may make the final recommendation determination using Equation 8a.

$$\text{Final\_Recommendation (Cluster Level)=If} \\ ((\tau_{Cluster\_CPU} \& T_{Cluster\_RAM}<=\emptyset_{CPU/RAM}) \& \\ ([\tau_{Cluster}+\theta_{Cluster}*\tau_{Cluster}]<=\delta(\beta_{Max\_Rec\_Cluster})) \\ \text{THEN "Accept Recommendation" ELSE "No} \\ \text{Action"}) \quad \text{Equation 8a}$$

Where,
$\tau_{Cluster\_CPU}$=Average CPU tier of cluster
$\tau_{Cluster\_RAM}$=Average RAM tier of cluster $\emptyset_{CPU/RAM}$=CPU/RAM tier threshold for the cluster
$\tau_{Cluster}$=Recommended volume for cluster
$\theta_{Cluster}$=Volume buffer
$\delta$=Cluster volume threshold
$\beta_{Max\_Rec\_Cluster}$=Max cluster volume for recommended cluster volume type Where the average recommended computing capacity tier and the average recommended memory capacity tier is greater than the predetermined computing/memory capacity tier threshold for the service cluster, the RCOL may make the final recommendation determination using Equation 8b.

$$\begin{aligned}&\text{Final\_Recommendation (Cluster Level)=If}\\&\quad((\tau_{Cluster\_CPU} \,\&\, \tau_{Cluster\_RAM} > \emptyset_{CPU/RAM}) \,\&\, \\&\quad([\tau_{Cluster} + \theta_{Cluster} * \tau_{Cluster}] > \delta \\&\quad(\beta Max\_Rec\_Cluster)) \text{ THEN ``Upsize Cluster}\\&\quad\text{Volume Only'' ELSE ``No Action'')} \quad \text{Equation 8a}\end{aligned}$$

Where,
$\tau_{Cluster\_CPU}$=Average CPU tier of cluster
$\tau Cluster\_RAM$=Average RAM tier of cluster
$\emptyset_{CPU/RAM}$=CPU/RAM tier threshold for the cluster
$\tau_{Cluster}$=Recommended volume for cluster
$\theta_{Cluster}$=Volume buffer
$\delta$=Cluster volume threshold
$\beta_{Max\_Rec\_Cluster}$=Max cluster volume for recommended cluster volume type Optionally, the RCOL 300 may output the final resource configuration optimization recommendation for individual service resource units to the data accumulator 427. At the accumulator enabler 428, the RCOL 300 may monitor if all of the service resource units have been analyzed at the multi-tier recommendation logic block 420.

Optionally, the RCOL 300 may generate a consumption optimization preview for the service resource unit based on the final resource configuration optimization recommendation. The consumption optimization preview may indicate potential cost savings because of optimization recommendations for the service resource unit. For example, at the saving calculator 452 of the system 400, the RCOL 300 may calculate the potential cost savings as difference between the current consumption metric of the service resource unit and the optimized consumption metric of the service resource unit due to applying the recommended resource configuration to the service resource unit.

Generally, the more the potential savings are, the higher priority that the service resource unit should be optimized. For example, for the service resource units undergoing the resource configuration optimization analysis, the RCOL 300 may sort their potential savings in descending order and calculate cumulative saving percentages incrementally for each of the service resource units in the descending order.

As an example, if the cumulative savings percentage for a service resource unit is less than or equal to 65%, the optimization priority for the service resource unit is set to be high. If the cumulative savings percentage for a service resource unit is less than or equal to 85% but greater than 65%, the optimization priority for the service resource unit is set to be medium. If the cumulative savings percentage for a service resource unit is greater than 85%, the optimization priority for the service resource unit is set to be low.

Optionally, the RCOL 300 may execute the similar operations at the prescriptive engine layer 250 to output respective service resource unit optimization recommendations for each of the service resource units undergoing the service resource unit optimization analysis. Upon the service resource unit optimization recommendations are output, the RCOL 300 then may, at the prescriptive engine layer 250, store the service resource unit optimization recommendations via a memory operation at the data staging layer 205.

Now referring to the presentation layer 260 in FIG. 2, where the RCOL 300 may access the optimization recommendations from the prescriptive engine layer 250, e.g., via data staging layer 205 memory operations to generate a RCO-control interface 266 including a RCO-window presentation 268. The RCO-window presentation 268 may include data and/or selectable options related to the optimization recommendations such as instance type, storage volume type, and storage volume size.

Figure 6:
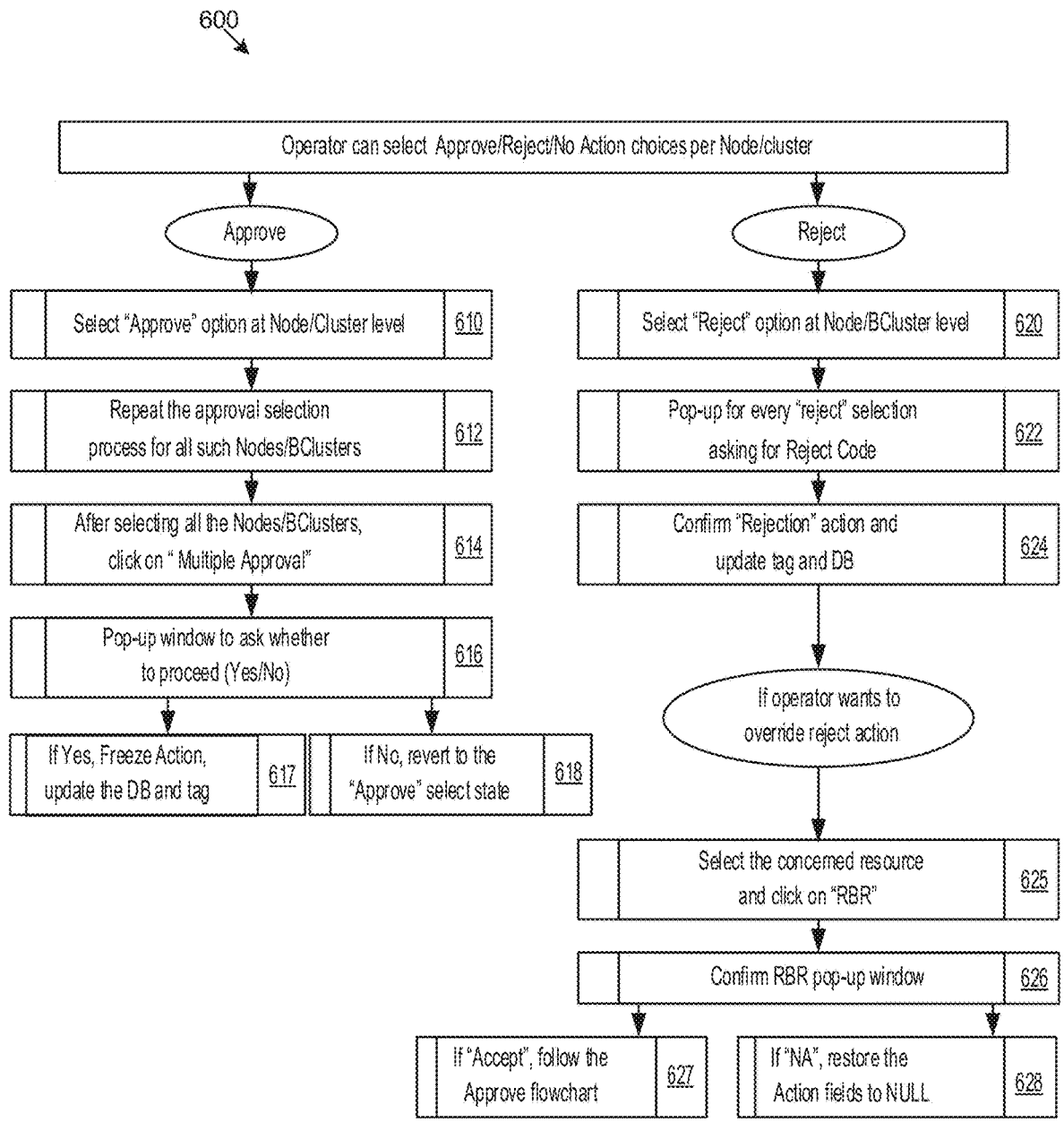
FIG. 6 shows an exemplary interaction logic with a resource configuration optimization control interface in accordance with an embodiment.

Additionally or alternatively, the RCO-window presentation 268 may include an option to approve/reject one or more (or all of) the resource configuration optimization recommendations for the service resource unit. FIG. 6 shows an example interaction logic 600 between input signals received from an operator and the RCO-window presentation 268 to approve/reject the displayed optimization recommendations. Specifically, the operator may take approval/rejection action per storage account and service resource unit in the RCO-window presentation 268.

For example, the RCO-window presentation 268 may include "Approve," "Reject," and "No action" options for each of the service resource units including nodes and clusters. The operator may select "Approve" option at node/cluster level (610) and repeat the "Approve" selection for other nodes/clusters (612). After finishing the option selections for all the nodes/clusters, the operator may click on "Multiple Approval" option (614). As response, the RCO-window presentation 268 may pop-up a window to ask the operator to confirm to proceed with "Yes" and/or "No" options (616). If the operator selects "Yes" option, the RCO-window presentation 268 may freeze action in the window and update the operator's inputs in the background storage storing the inputs (617). If the operator selects "No" option, the RCO-window presentation 268 may revert to the "Approve" selection state (618).

The operator may also select "Reject" option at node/cluster level (620). For each "Reject" selection, the RCO-window presentation 268 may pop up a window to ask for a rejection code justifying the rejection (622). Where the rejection code is verified, the RCO-window presentation 268 may confirm the rejection action and update the operator's inputs in the background storage (624).

Optionally, if the operator would like to override his/her previous rejection action, the operator may select the concerned nodes/clusters and click "RBR" (Roll Back Required) option (625). As response, the RCO-window presentation 268 may pop up a window to confirm the "RBR" selection with "Accept" and "NA" (Not Accept) options (626). If the operator selects "Accept" option, the RCO-window presentation 268 may enable to select the "Approve" option for the concerned nodes/clusters (627). If the operator selects "NA", the RCO-window presentation 268 may nullify all the selection actions with respect to the concerned nodes/clusters (628).

Through the interaction with the operator via the RCO-control interface, the RCOL 300 may determine whether to execute the recommended resource configuration optimization for the service resource unit. Where the RCOL 300 determines to execute the recommended optimization, the RCOL 300 may generate the RCO token 252 according to the final recommended resource configuration. The RCO token 252 may, for example, include logic provisioning the service resource unit with the final recommended resource configuration.

After generation of the RCO token 252, the RCOL 300 may initiate deployment of the RCO token 252 by sending the RCO token 252 to the network interface circuitry (e.g., the network interface circuitry 110) and causing the network interface circuitry to send the RCO token 252 to a host interface (e.g., the host interface 130) for service resource unit optimization. For example, services such as Amazon® Web Services (AWS), Cloudian, Microsoft® Azure, or other cloud computing services, may maintain host interfaces (e.g., web interfaces, application programming interfaces, or other interfaces) by which cloud user/system operator may manage the service resource units.

In some cases, the RCOL 300 may initiate deployment via the data export layer 270. The data export layer 270 may format the reservation matrix in one or more formats for transfer. For example, the data export layer 270 may support format translation to java script object notation (JSON), extensible markup language (XML), comma separated value (CSV), Tableau Workbook (TBWX), hypertext markup language (HTML) or other formats. The data export layer 270 may also support transfer of the RCO token in one or more states, such as flat file transfers, streaming transfers, web service access, internet protocol transfers, or other transfers. Additionally or alternatively, the RCOL 300 may initiate deployment via the prescriptive engine layer 250 through direct transfer, direct network access, or other non-export transfer.

FIG. 7 shows an example system execution environment 700 for the RCO stack 200 described above. The execution environment 700 may include system logic 714 to support execution of the multiple layers of RCO stack 200 described above. The system logic may include processors 716, memory 720, and/or other circuitry.

The memory 720 may include analytic model parameters 752, optimization routines 754, and operational rules 756. The memory 720 may further include applications and structures 766, for example, coded objects, machine instructions, templates, or other structures to support pre-processing the resource utilization tracking data, obtaining computing/memory/input/output utilization metrics, generating computing/memory capacity rightsizing recommendation, determining a recommended instance type, performing storage volume check and network payload check, or other tasks described herein. The applications and structures 766 may implement at least part of the RCOL 300.

The execution environment 700 may also include network interface circuitry 712, which may support wireless, e.g. Bluetooth, Wi-Fi, WLAN, cellular (4G, LTE/A, 5G), and/or wired, Ethernet, Gigabit Ethernet, optical networking protocols. The network interface circuitry 712 may also include serial interfaces, such as universal serial bus (USB), serial ATA, IEEE 1394, lighting port, I²C, slimBus, or other serial interfaces. The network interface circuitry 712 may be used to support and/or implement remote operation of the RCO-control interface 266. The execution environment 700 may include power functions 734 and various input interfaces 728. The execution environment may also include a user interface 718 that may include human-to-machine interface devices and/or graphical user interfaces (GUI). The user interface 718 may be used to support and/or implement local operation of the RCO-control interface 266. In various implementations, the system logic 714 may be distributed over one or more physical servers, be implemented as one or more virtual machines, be implemented in container environments such as Cloud Foundry or Docker, and/or be implemented in serverless (functions as-a-Service) environments.

In some cases, the execution environment 700 may be a specially defined computational system deployed in a cloud platform. In some cases, the parameters defining the execution environment may be specified in a manifest for cloud deployment. The manifest may be used by an operator to requisition cloud based hardware resources, and then deploy the software components, for example, the RCO stack 200, of the execution environment onto the hardware resources. In some cases, a manifest may be stored as a preference file such as a YAML (yet another mark-up language), JSON, or other preference file type. Additionally or alternatively, the manifest may include custom scripts to implement the RCO stack 200 in a serverless environment. Therein, a multiple-tier framework is described. The framework describes a series of the serverless tasks controlled via scripts. The serverless tasks overlap in execution to maintain continuity across the tasks. The computational task is divided into chunks that may be handled by individual serverless tasks. Accordingly, a complex analytic process, such as those describe in this disclosure, may be divided into chunks and executed over one or more overlapping serverless tasks.

The methods, devices, processing, circuitry, and logic described above may be implemented in many different ways and in many different combinations of hardware and software. For example, all or parts of the system, including the network interface circuitry and the optimization circuitry, may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible service resource unit medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

Implementations of the system may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

What is claimed is:

1. A system comprising:
   network interface circuitry configured to:
      receive resource utilization tracking data and resource configuration data of a service resource unit for a cloud-based data analytics service; and
      send a resource configuration optimization (RCO) token to a host interface, the host interface configured to execute the RCO token to optimize resource configuration of the service resource unit;
   optimization circuitry in data communication with the network interface circuitry, the optimization circuitry configured to execute a RCO stack, the RCO stack executable to:
      obtain computing utilization metrics of computing capacity provisioned to the service resource unit based on the resource utilization tracking data;
      generate a computing capacity rightsizing recommendation on the computing capacity based on the computing utilization metrics;
      obtain memory utilization metrics of memory capacity provisioned to the service resource unit based on the resource utilization tracking data;
      generate a memory capacity rightsizing recommendation on the memory capacity based on the memory utilization metrics;
      determine a recommended instance type for the service resource unit based on the computing capacity rightsizing recommendation and the memory capacity rightsizing recommendation;
      obtain a storage volume type of the service resource unit from the resource configuration data, the storage volume type indicating input/output (I/O) capacity provisioned to the service resource unit;
      obtain I/O utilization metrics of the I/O capacity provisioned to the service resource unit based on the resource utilization tracking data;
      generate a volume type recommendation for the service resource unit based on the storage volume type and the I/O utilization metrics;
      calculate an actual used storage volume size of a storage capacity provisioned to the service resource unit based on the resource configuration data with respect to the storage capacity, the actual used storage volume size representing a volume size of storage storing data in the storage capacity;
      perform a storage volume check on the service resource unit based on the computing capacity rightsizing recommendation, the memory capacity rightsizing recommendation, and the actual used storage volume size, to obtain a storage volume check result;
      determine whether to accept the recommended instance type as a final optimization recommendation based on the storage volume check result, the computing capacity rightsizing recommendation, and the memory capacity rightsizing recommendation;
      in response to the acceptance, generate the RCO token to include instructions executable by the host interface to optimize the resource configuration of the service resource unit according to the final optimization recommendation; and
      send the RCO token to the host interface via the network interface circuitry.

2. The system of claim 1, wherein the optimization circuitry is further configured to:
   perform a network payload check on the service resource unit based on the recommended instance type, to obtain a network payload check result; and
   determining whether to accept the recommended instance type as the final optimization recommendation if further based on the network payload check result.

3. The system of claim 1, wherein the optimization circuitry is configured to:
   determine if an application running on the service resource unit is single-threaded based on the resource utilization tracking data and the resource configuration data; and
   in response to the determination that the application is not single-threaded, generate the computing capacity rightsizing recommendation on the computing capacity based on the computing utilization metrics.

4. The system of claim 3, wherein the optimization circuitry is configured to:
   obtain maximum computing utilization value and percentile-based utilization value from the computing utilization metrics;
   generate the computing capacity rightsizing recommendation based on the maximum computing utilization value and percentile-based utilization value, the computing capacity rightsizing recommendation comprising an indication of whether to rightsize the computing capacity.

5. The system of claim 4, wherein the computing capacity rightsizing recommendation further comprises a recommended number of processing units and the optimization circuitry is configured to:
   obtain a recommended computing capacity tier based on the recommended number of processing units.

6. The system of claim 1, wherein the optimization circuitry is configured to:
   obtain maximum memory utilization value and a plurality of percentile-based memory utilization values over non-overlapping operational time ranges from the memory utilization metrics;
   perform weighted sum of the plurality of percentile-based memory utilization values to obtain a weighted sum value;
   generate the memory capacity rightsizing recommendation based on the maximum memory utilization value and the weighted sum value, the memory capacity rightsizing recommendation comprising an indication of whether to rightsize the memory capacity.

7. The system of claim 6, wherein the memory capacity rightsizing recommendation further comprises a recommended number of memory units and the optimization circuitry is configured to:
   obtain a recommended memory capacity tier based on the recommended number of memory units.

8. The system of claim 1, wherein the storage volume type comprising solid-state drive based types and hard disk drive based types, and
   the I/O utilization metrics comprises I/O operation rate and I/O throughput rate.

9. The system of claim 8, wherein the volume type recommendation comprises a transition recommendation between solid-state drive types, the optimization circuitry is configured to:
  obtain a maximum I/O operation rate and a percentile-based I/O operation rate from the I/O utilization metrics;
  determine a recommended I/O operation rate for the service resource unit based on the maximum I/O operation rate and the percentile-based I/O operation rate;
  obtain an I/O block size based on the storage volume type of the service resource unit;
  determine a recommended throughput rate based on the recommended I/O operation rate and the I/O block size of the service resource unit; and
  generate the volume type recommendation based on the recommended I/O operation rate, the recommended throughput rate, a provisioned I/O operation rate on the service resource unit, and a provisioned throughput rate on the service resource unit.

10. The system of claim 9, wherein the volume type recommendation comprises a recommended storage volume for the service resource unit, the optimization circuitry is configured to:
  determine the recommended storage volume based on the actual used storage volume size and the recommended I/O operation rate.

11. The system of claim 8, wherein the volume type recommendation comprises a transition recommendation to hard disk drive types, the optimization circuitry is configured to:
  obtain a maximum through rate and a percentile-based throughput rate from the I/O utilization metrics;
  obtain a normalized baseline throughput rate based on the volume type of the service resource unit;
  determine a recommended throughput rate based on the maximum through rate, the percentile-based throughput rate, and the normalized baseline throughput rate;
  obtain an I/O block size based on the volume type of the service resource unit;
  determine a recommended I/O operation rate based on the recommended throughput rate and the I/O block size;
  generating the volume type recommendation based on the recommended I/O operation rate, the recommended throughput rate, a provisioned I/O operation rate on the service resource unit, and a provisioned throughput rate on the service resource unit.

12. The system of claim 11, wherein the optimization circuitry is configured to obtain the normalized baseline throughput rate by:
  obtaining a baseline I/O operation rate based on the volume type of the service resource unit;
  determining burst balance information of the service resource unit based on the baseline I/O operation rate;
  normalizing the baseline I/O operation rate based on the burst balance information; and
  calculating the normalized baseline throughput rate based on the normalized baseline I/O operation rate.

13. The system of claim 11, wherein the volume type recommendation comprises a recommended storage volume for the service resource unit, the optimization circuitry is configured to:
  determine the recommended storage volume based on the actual used storage volume size and the recommended throughput rate.

14. The system of claim 1, wherein the optimization circuitry is configured to calculate the actual used storage volume size by:
  calculating the actual used storage volume size based on source data size, a number of replicas, indexing overhead, and system reserved storage volume in the service resource unit.

15. The system of claim 1, wherein the service resource unit is a service node or a service cluster.

16. A method comprising:
  receiving, at network interface circuitry, resource utilization tracking data and resource configuration data of a service resource unit for a cloud-based data analytics service;
  executing a resource configuration optimization (RCO) stack at optimization circuitry, the optimization circuitry in data communication with the network interface circuitry, wherein executing the RCO stack comprises:
    obtaining computing utilization metrics of computing capacity provisioned to the service resource unit based on the resource utilization tracking data;
    generating a computing capacity rightsizing recommendation on the computing capacity based on the computing utilization metrics;
    obtaining memory utilization metrics of memory capacity provisioned the service resource unit based on the resource utilization tracking data;
    generating a memory capacity rightsizing recommendation on the memory capacity based on the memory utilization metrics;
    determining a recommended instance type for the service resource unit based on the computing capacity rightsizing recommendation and the memory capacity rightsizing recommendation;
    obtaining a storage volume type of the service resource unit from the resource configuration data, the storage volume type indicating input/output (I/O) capacity provisioned to the service resource unit;
    obtaining I/O utilization metrics of the I/O capacity provisioned to the service resource unit based on the resource utilization tracking data;
    generating a volume type recommendation for the service resource unit based on the storage volume type and the I/O utilization metrics;
    calculating an actual used storage volume size of a storage capacity provisioned to the service resource unit based on the resource configuration data with respect to the storage capacity, the actual used storage volume size representing a volume size of storage storing data in the storage capacity;
    performing a storage volume check on the service resource unit based on the computing capacity rightsizing recommendation, the memory capacity rightsizing recommendation, and the actual used storage volume size, to obtain a storage volume check result;
    determining whether to accept the recommended instance type as a final optimization recommendation based on the storage volume check result, the computing capacity rightsizing recommendation, and the memory capacity rightsizing recommendation;
    in response to the acceptance, generating a RCO token to include instructions executable by a host interface to optimize the resource configuration of the service resource unit according to the final optimization recommendation; and sending the RCO token, via the network interface circuitry, to the host interface.

17. The method of claim 16, wherein executing the RCO stack further comprises:
performing a network payload check on the service resource unit based on the recommended instance type, to obtain a network payload check result; and
determining whether to accept the recommended instance type as the final optimization recommendation if further based on the network payload check result.

18. The method of claim 16, wherein executing the RCO stack comprises:
obtaining a maximum computing utilization value and a percentile-based utilization value from the computing utilization metrics;
generating the computing capacity rightsizing recommendation based on the maximum computing utilization value and percentile-based utilization value, the computing capacity rightsizing recommendation comprising an indication of whether to rightsize the computing capacity.

19. The method of claim 16, wherein executing the RCO stack comprises:
obtaining a maximum memory utilization value and a plurality of percentile-based memory utilization values over non-overlapping operational time ranges from the memory utilization metrics;
performing weighted sum of the plurality of percentile-based memory utilization values to obtain a weighted sum value;
generating the memory capacity rightsizing recommendation based on the maximum memory utilization value and the weighted sum value, the memory capacity rightsizing recommendation comprising an indication of whether to rightsize the memory capacity.

20. A product including:
machine-readable media other than a transitory signal; and
instructions stored on the machine-readable media, the instructions configured to, when executed, cause a machine to:
receive, at network interface circuitry, resource utilization tracking data and resource configuration data of a service resource unit for a cloud-based data analytics service;
execute, at optimization circuitry in data communication with the network interface circuitry, a resource configuration optimization (RCO) stack, the RCO stack being executable to:
obtain computing utilization metrics of computing capacity provisioned to the service resource unit based on the resource utilization tracking data;
generate a computing capacity rightsizing recommendation on the computing capacity based on the computing utilization metrics;
obtain memory utilization metrics of memory capacity provisioned the service resource unit based on the resource utilization tracking data;
generate a memory capacity rightsizing recommendation on the memory capacity based on the memory utilization metrics;
determine a recommended instance type for the service resource unit based on the computing capacity rightsizing recommendation and the memory capacity rightsizing recommendation;
obtain a storage volume type of the service resource unit from the resource configuration data, the storage volume type indicating input/output (I/O) capacity provisioned to the service resource unit;
obtain I/O utilization metrics of the I/O capacity provisioned to the service resource unit based on the resource utilization tracking data;
generate a volume type recommendation for the service resource unit based on the storage volume type and the I/O utilization metrics;
calculate an actual used storage volume size of a storage capacity provisioned to the service resource unit based on the resource configuration data with respect to the storage capacity, the actual used storage volume size representing a volume size of storage storing data in the storage capacity;
perform a storage volume check on the service resource unit based on the computing capacity rightsizing recommendation, the memory capacity rightsizing recommendation, and the actual used storage volume size, to obtain a storage volume check result;
determine whether to accept the recommended instance type as a final optimization recommendation based on the storage volume check result, the computing capacity rightsizing recommendation, and the memory capacity rightsizing recommendation;
in response to the acceptance, generate a RCO token to include instructions executable by a host interface to optimize the resource configuration of the service resource unit according to the final optimization recommendation; and
send the RCO token, via the network interface circuitry, to the host interface.

* * * * *